Nov. 16, 1954     L. E. ROVNER ET AL     2,694,259

STYLUS BASE MECHANISM

Filed March 21, 1946

INVENTOR
LEOPOLD E. ROVNER
CARL K. HANSEN

BY *M. A. Hayes*

ATTORNEY

United States Patent Office

2,694,259
Patented Nov. 16, 1954

2,694,259

STYLUS BASE MECHANISM

Leopold E. Rovner, Iowa City, Iowa, and Carl K. Hansen, Arlington, Mass., assignors, by mesne assignments, to the United States of America as represented by the Secretary of the Navy Application March 21, 1946, Serial No. 656,028

11 Claims. (Cl. 33—27)

This invention relates to geometrical curve-producing instruments and more particularly to improvements in stylus mechanisms for such instruments.

When a stylus mechanism such as is disclosed in the copending application of Philip H. Miller and Leopold E. Rovner for a Tension-Equilibrium-Seeking Stylus Mechanism, Serial Number 652,198, filed March 5, 1946, is pulled by the resultant of the forces of the two cords of a hyperbolograph instrument, it is necessary not only that the stylus point faithfully swing into equlibrium position but also that the stylus unit travel over a level surface without drift.

A single rear drag point permits good swivel action of the swivel arm of the stylus mechanism but this single drag point produces an unavoidable and uncompensatable drift of the stylus unit. Drift is here defined as motion in other than a straight line undergone by the stylus unit when it is pulled by a single cord toward a fixed point over a flat and level surface.

The principal object of this invention is to provide improvements in stylus mechanisms for hyperbolograph instruments.

Another object of this invention is to provide a base mechanism for the stylus unit of a hyperbolograph instrument.

A further object of this invention is to provide a stylus-base mechanism for a hyperbolograph instrument which uses two adjustable spring mounted rear drag pads to give an effective single rear drag point, the mounting disk of the pads being adjustable to produce zero drift of a stylus unit.

Other and further objects will appear during the course of the following description when taken with the accompanying drawings in which.

Figure 1:
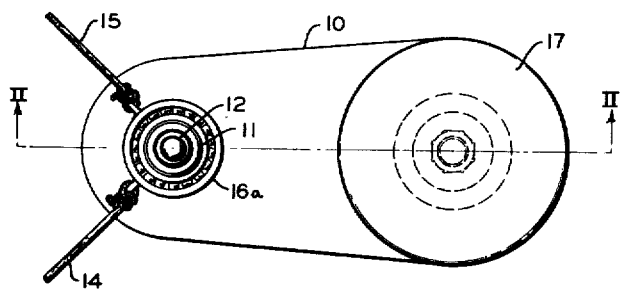
Fig. 1 is a top view of one embodiment of this invention.

In Fig. 1, a swivel arm 10 is drilled and threaded near one end to receive a sleeve-like holder 11, in which there is inserted a conventional stylus 12 whose point 13 (Fig. 2) traces the path of the unit as it is pulled along on the horizontal surface on which the curve is being drawn. As shown, cords 14 and 15 of the hyperbolograph instrument are secured to holder 11 by being passed through the eyelets on ball bearings 16a and 16b respectively and tied thereto, these ball bearings being coaxially mounted on holder 11. Alternatively, cords 14 and 15 may be secured to holder 11 by tension gauge rings such as are disclosed in the copending application of Carl K. Hansen, Philip H. Miller and Leopold E. Rovner for a Cord Tension Indicator, Serial Number 645,623, filed February 5, 1946. At the other end of swivel arm 10 is a cylindrical weight 17 of a suitable heavy material such as brass or lead which helps produce frictional drag of the unit.

Figure 2:
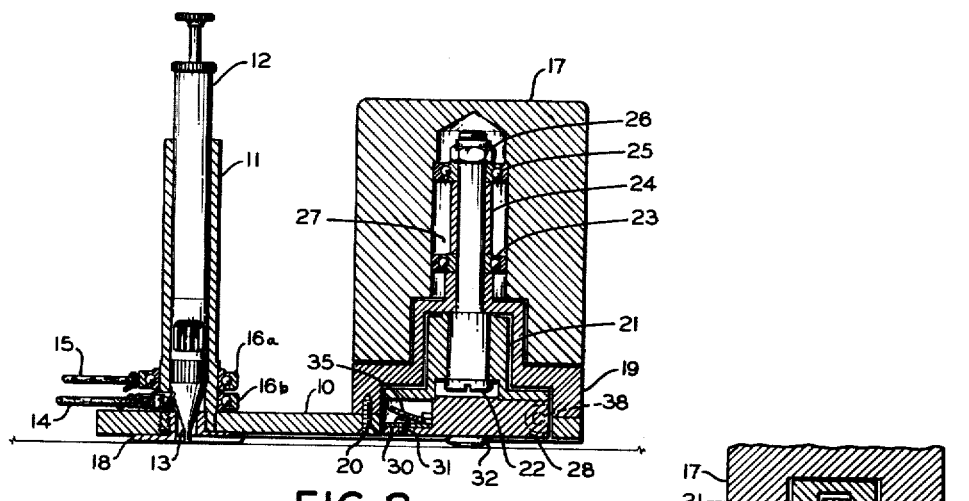
Fig. 2 is a generally cross sectional view taken along line II—II of Fig. 1.

Referring now to Fig. 2 a metallic front pad 18 is mounted by means of a threaded shoulder coaxial with and below holder 11, which is threaded to receive this shoulder. A slot is milled from the under surface and at the rear of front pad 18 and from the under surface of swivel arm 10 to prevent smearing the ink line drawn during operation of the stylus unit. Mounted over a hole in the other end of swivel arm 10 is a cylindrical hollow boss 19 having portions of periodically reduced diameter and secured to swivel arm 10 by screws 20 as shown. Disposed within cylindrical boss 19 is a rotatably mounted sleeve 21 having a flanged portion on the lower surface thereof and an annular ring on the upper surface thereof. A bolt 22 extends through sleeve 21 and has a reduced diameter portion thereof which further extends through and beyond boss 19. Ball bearing 23 is mounted coaxially over the reduced diameter portion of bolt 22 and is supported by the upper surface of boss 19. A sleeve 24, fitted over bolt 22 above bearing 23, positions a second ball bearing 25 which is also mounted coaxially about bolt 22. Bolt 22 is retained in position by means of a nut 26. The reduced diameter portion of bolt 22 forms a shoulder which is fixed against the under surface of that portion of boss 19 which supports ball bearing 23. The annular ring on the upper surface of sleeve 21 provides a bearing surface contact with this under surface of boss 19 and is of such thickness that sleeve 21 is rotatably mounted upon bolt 22 irrespective of the tension applied by means of the bolt. A hole 27 having periodically reduced diameter is drilled axially up from the bottom of weight 17 as shown. Weight 17 is mounted coaxially about bolt 22 and is positioned and supported by ball bearings 23 and 25 so that it is free to rotate about the axis of bolt 22.

Figure 4:
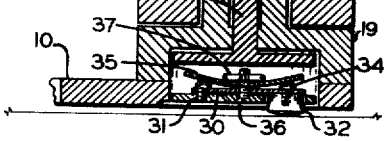
Fig. 4 is a generally cross sectional view taken along the line IV——IV of Fig. 3.
Figure 3:
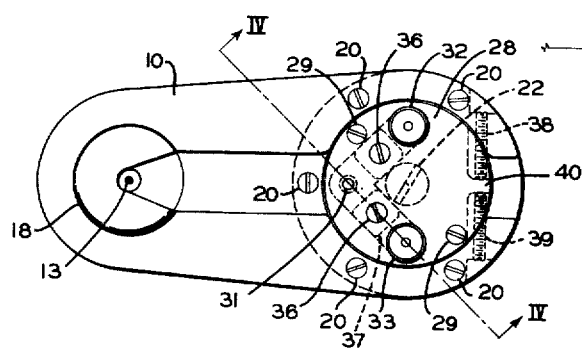
Fig. 3 is a bottom view of the embodiment of Fig. 1.

A circular disc insert 28 is fixedly secured below the flanged portion of sleeve 21 by means of screws 29 (Fig. 3). In a V-shaped slot milled out of the top of disc 28 is mounted a flat V-shaped spring 30 which is secured near its vertex to disc 28 by screw 31. Two metallic rear drag pads 32 and 33 extend through holes in disc 28 and are secured to the ends of spring 30 by screws 34 as shown in Figs. 3 and 4. A second flat V-shaped spring 35 is mounted over the heads of screws 31 and 34 and secured to disc 28 by screws 36 (which pass through holes in spring 30) and nuts 37. Nuts 37 are prevented from rotating since they fit snugly in the V-shaped slot in disc 28. Thus the flexure of spring 35 and the tension on rear drag pads 32 and 33 is adjustable by turning screws 36. Two holes are drilled in from the edge and near the rear of swivel arm 10, and are threaded to receive set screws 38 and 39 as shown in Fig. 3. Disc 28 is milled out to form recesses leaving a projection 40 against which set screws 38 and 39 bear. Adjustment of the orientation of disc 28 in the horizontal plane and consequently the orientation of drag pads 32 and 33 is thus provided by adjustment of set screws 38 and 39.

The stylus unit rests on the horizontal surface on the three pads 18, 32 and 33. The front pad 18 serves as a damping pad since it acts like a very light brake preventing overshooting of the equilibrium-seeking motions of swivel arm 10 as the stylus unit is pulled across the horizontal surface. The knee action of the two spring mounted rear pads 31 and 32 causes equal normal pressures on the bearing surfaces of the rear pads such that the effective pivot point lies between these pads as a virtual drag point. Because of the equal normal pressure on these rear pads (produced by proper adjustment of the spring flexure adjustment screws 36) there is equal frictional drag at each one, and the spring action of their mounting permits passage over shallow or low surface irregularities without the irregular walking motion produced when the rear pads are stiffly connected to the overlying mass. No turning moments are introduced between the rear pads as the stylus unit moves along its long axis, and only very small turning moments are produced, due to friction, when the stylus axis is subject to resultant forces whose directions lie at small angles to the long axis of the base mechanism.

The zero drift adjustment is an arrangement of the three pressure areas on which the stylus unit rests, in which the two rear drag pads are capable of being revolved in the horizontal plane about the virtual drag center. In operation of the stylus unit with only one cord attached the maximum displacement of the line drawn from a straight line should be less than one-eighth inch. If the displacement is greater than this amount the set screw 38 or 39 on the side to which the displacement occurred is loosened slightly and the other set screw tightened to lock disc 28 in its new orientation. The adjustment procedure is repeated until the maximum displacement is less than one-eighth inch.

This invention is only to be limited by the appended claims.

What is claimed is:

1. In combination with a hyperbolograph stylus unit having a swivel arm, a stylus and a weight, a base mechanism comprising a plurality of bearing surfaces, including two drag points provided on the under surface of said swivel arm, means for providing relative adjustment of the position of said two drag points relative to said swivel arm, and means permitting elastic movement between said pair of drag points and said swivel arm in response to irregularities in the surface over which said stylus unit is moving, whereby said stylus unit travels over said surface smoothly and without drift.

2. In combination with a hyperbolograph stylus unit having a swivel arm, a stylus, means for attaching two filaments to said swivel arm adjacent said stylus and a weight, a base mechanism comprising a front damping pad and two rear drag pads provided on the under surface of said swivel arm, means for providing relative adjustment of the position of said two rear drag pads relative to said swivel arm, and means permitting relative elastic movement between the two rear drag pads and said swivel arm in response to irregularities in the surface over which said stylus is moving, whereby said stylus unit travels uniformly and without drift over said surface when drawn by said two filaments attached to said swivel arm adjacent said stylus.

3. In combination with a hyperbolograph stylus unit having a swivel arm, a stylus mounted near one end of said swivel arm, means for attaching two filaments to said swivel arm adjacent said stylus and a weight mounted by ball bearings near the other end of said swivel arm, a base mechanism comprising a front damping pad provided on the under surface of said swivel arm adjacent said stylus, two rear drag pads, said rear drag pads being spring mounted symmetrically on either side of the longitudinal axis of said swivel arm beneath said weight, and means for providing rotational adjustments in the position of said rear drag pads about an axis perpendicular to the plane defined by said front damping pad and said two rear drag pads, whereby said stylus unit travels without drift over a level surface when drawn by said two filaments attached to said swivel arm adjacent said stylus.

4. In combination with a hyperbolograph stylus unit having a swivel arm, a stylus mounted near one end of said swivel arm, means for attaching two filaments to said swivel arm adjacent said stylus and a weight mounted by ball bearings near the other end of said swivel arm, a base mechanism comprising a front damping pad provided on the under surface of said swivel arm adjacent said stylus, two rear drag pads, a circular disc mounted in a hole in said swivel arm adjacent said weight, a flat V-shaped spring, said rear drag pads being attached to the ends of said spring and extending through holes in said disc such that they are symmetrically disposed on either side of the longitudinal axis of said swivel arm, said spring being attached near its vertex to the upper side of said disc, and said disc being adjustable about a vertical axis to provide rotation in the horizontal plane, whereby said stylus unit travels without drift over a level surface when drawn by said two filaments attached to said swivel arm adjacent said stylus.

5. A stylus mechanism for a curve-producing instrument comprising, a swivel arm, a stylus mounted at a first end of said swivel arm, a weight rotatably mounted at a second end of said swivel arm, means for attaching driving filaments to said swivel arm, said attaching means being rotatably secured to said swivel arm, the axis of rotation of said attaching means being coincident with the position of said stylus, a front supporting pad provided on the undersurface of said swivel arm adjacent said stylus, a rear pad supporting member rotatably secured to the underside of said swivel arm at said second end, means for locking said pad supporting member against rotation in a preselected adjusted position, and first and second rear pads secured to the underside of said rear pad supporting member in a spaced apart relationship.

6. A stylus mechanism for a curve-producing instrument comprising, a swivel arm, a stylus mounted at a first end of said swivel arm, a weight rotatably mounted on the upper surface of said swivel arm at a second end thereof, said weight being mounted for rotation about an axis perpendicular to said swivel arm, means for attaching driving filaments to said swivel arm adjacent said stylus, a front supporting pad provided on the undersurface of said swivel arm adjacent said stylus, a rear pad supporting member rotatably secured to the underside of said swivel arm, the rotational axis of said supporting member being coincident with the axis of rotation of said weight, means for locking said pad supporting member against rotation in a preselected, adjusted position, and first and second rear pads secured to the underside of said rear pad supporting member in a spaced apart relationship.

7. A stylus mechanism for a curve-producing instrument comprising, a swivel arm, a stylus mounted at a first end of said swivel arm, a weight rotatably mounted on the upper surface of said swivel arm at a second end thereof, said weight being mounted for rotation about an axis perpendicular to said swivel arm, means for attaching driving filaments to said swivel arm adjacent said stylus, a front supporting pad secured to the undersurface of said swivel arm adjacent said stylus, a rear pad supporting member rotatably secured to the underside of said swivel arm, the rotational axis of said supporting member being coincident with the axis of rotation of said weight, means for locking said rear pad supporting member against rotation in a preselected adjusted position, and first and second rear pads resiliently secured to said rear pad supporting member in a spaced apart relationship.

8. A stylus mechanism for a curve-producing instrument comprising, a swivel arm, a stylus mounted at a first end of said swivel arm, a weight rotatably mounted on the upper surface of said swivel arm at a second end thereof, said weight being mounted for rotation about an axis perpendicular to said swivel arm, means for attaching driving filaments to said swivel arm adjacent said stylus, a front supporting pad secured to the undersurface of said swivel arm adjacent said stylus, a rear pad supporting member rotatably secured to the underside of said swivel arm, the rotational axis of said supporting member being coincident with the axis of rotation of said weight, means for locking said rear pad supporting member against rotation in a preselected adjusted position, a V-shaped spring secured at its apex to said rear pad supporting member, and first and second rear pads secured to the extremities of the respective arms of said V-shaped spring.

9. A stylus mechanism for a geometrical curve-producing instrument comprising a swivel arm, a stylus mounted at a first end of said swivel arm, a weight rotatably mounted on the upper surface of said swivel arm at a second end thereof, said weight being mounted for rotation about an axis perpendicular to said swivel arm, means for attaching driving filaments to said swivel arm adjacent said stylus, a front supporting pad secured to the undersurface of said swivel arm adjacent said stylus, a rear pad supporting member rotatably secured to the underside of said swivel arm, the rotational axis of said supporting member being coincident with the axis of rotation of said weight, means for locking said rear pad and first and second rear pads secured to the extremities of the respective arms of said V-shaped spring.

10. A stylus mechanism as in claim 9, said stylus mechanism further comprising means for independently adjusting the effective resiliency of each arm of said V-shaped spring.

11. A stylus mechanism for a geometrical curve-producing instrument comprising, a swivel arm, a stylus mounted at a first end of said swivel arm, a weight rotatably mounted on the upper surface of said swivel arm at a second end thereof, said weight being mounted for rotation about an axis perpendicular to said swivel arm, supporting member against rotation in a preselected, adjusted position, a flat V-shaped spring secured at its apex to said rear pad supporting member, the arms of said spring being symmetrically disposed with respect to the axis of rotation of said rear pad supporting member, means for attaching driving filaments to said swivel arm adjacent said stylus, a front supporting pad secured to the undersurface of said swivel arm adjacent said stylus, a rear pad supporting member rotatably secured to the underside of said swivel arm, the rotational axis of said supporting member being coincident with the axis of rotation of said weight, means for locking said rear pad supporting member against rotation in a preselected adjusted position, a first flat V-shaped spring member secured at its apex to said rear pad supporting member, the arms of said spring member being symmetrically disposed with respect to the axis of rotation of said rear pad supporting member, first and second rear pads secured to the extremities of the respective arms of said V-shaped spring, a second V-shaped spring member overlying said first spring member with the extremities of said second spring member bearing against the extremities of the corresponding ends of said first spring member, and means associated with the arms of said second spring member for independently adjusting the forces exerted by said arms of said second spring member on the extremities of the arms of said first spring member.

No references cited.

UNITED STATES PATENT OFFICE
CERTIFICATE OF CORRECTION

Patent No. 2,694,259                              November 16, 1954

Leopold E. Rovner et al.

It is hereby certified that error appears in the above numbered patent requiring correction and that the said Letters Patent should read as corrected below.

Column 4, lines 72 to 76, strike out "supporting member against rotation in a preselected, adjusted position, a flat V-shaped spring secured at its apex to said rear pad supporting member, the arms of said spring being symmetrically disposed with respect to the axis of rotation of said rear pad supporting member," and insert the same after "pad" in line 59, same column 4.

Signed and sealed this 18th day of December 1962.

(SEAL)
Attest:

ERNEST W. SWIDER
Attesting Officer

DAVID L. LADD
Commissioner of Patents